Feb. 28, 1961 W. E. McCOWN ET AL 2,972,997
APPARATUS FOR CLEANING SURFACES
Filed April 9, 1956 2 Sheets-Sheet 1
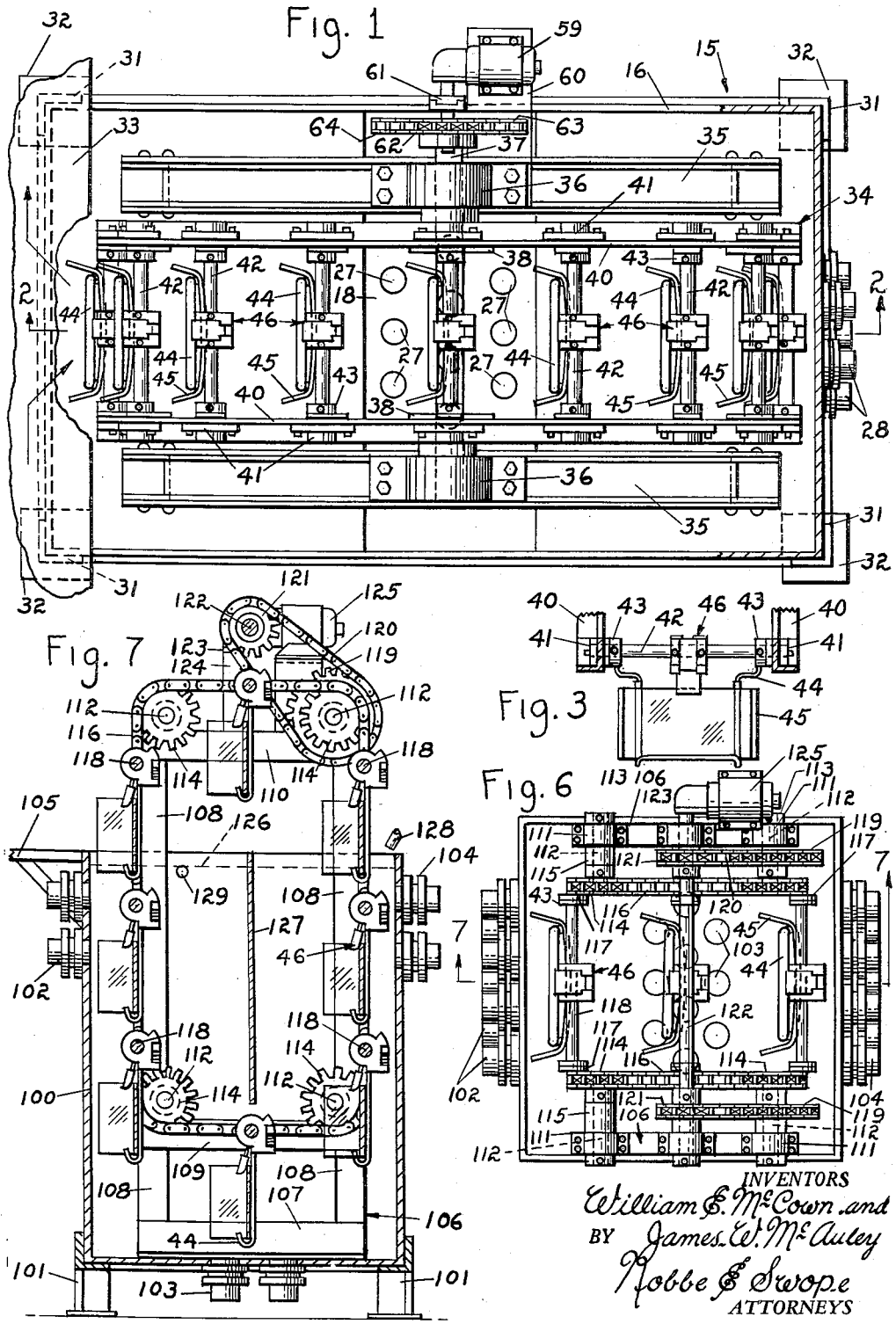
INVENTORS
William E. McCown and
BY James W. McAuley
Nobbe & Swope
ATTORNEYS Feb. 28, 1961    W. E. McCOWN ET AL    2,972,997
APPARATUS FOR CLEANING SURFACES
Filed April 9, 1956    2 Sheets-Sheet 2
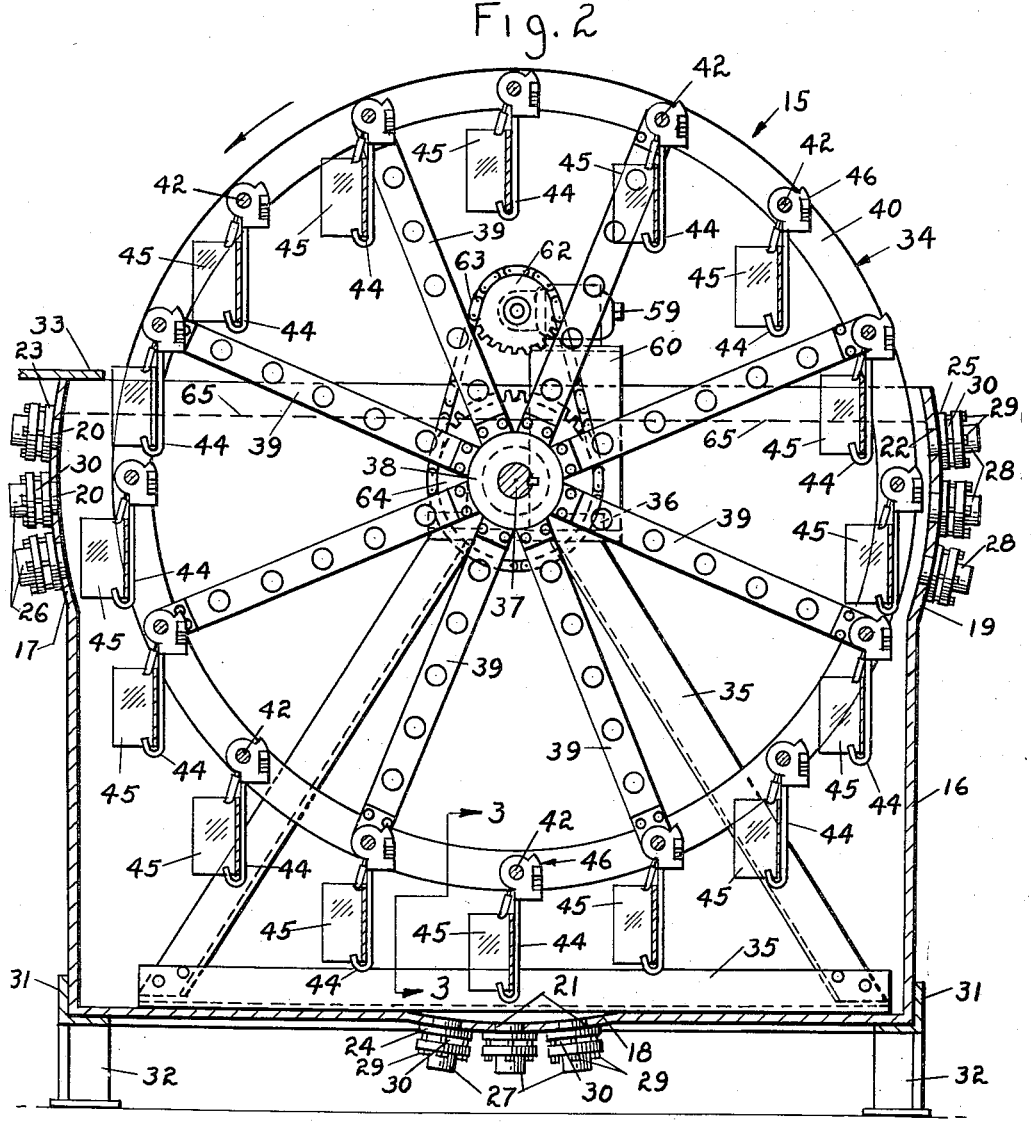
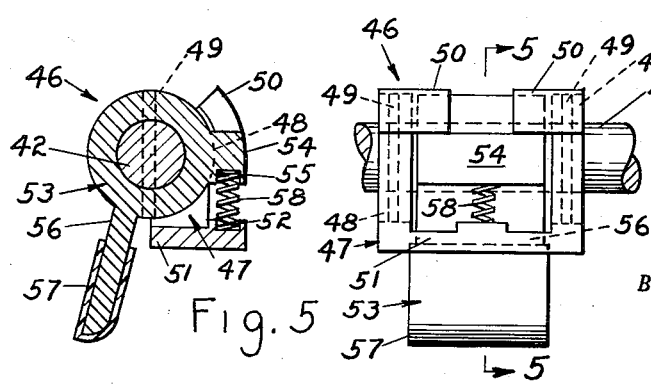
INVENTORS
William E. McCown and
BY James W. McAuley
Nobbe & Swope
ATTORNEYS excellent# United States Patent Office 2,972,997
Patented Feb. 28, 1961

2,972,997
APPARATUS FOR CLEANING SURFACES

William E. McCown and James W. McAuley, Toledo, Ohio, assignors to Libbey-Owens-Ford Glass Company, Toledo, Ohio, a corporation of Ohio Filed Apr. 9, 1956, Ser. No. 577,023

5 Claims. (Cl. 134—128)

The present invention relates broadly to washing or cleaning sheet material and more particularly to an improved apparatus for washing curved sheets of glass and the like.

Although the invention is not restricted to the washing of any particular article, whether of glass or other material, it is especially well adapted to carry out the difficult cleaning jobs encountered in connection with the production of present-day curved laminated safety glass winshields for automobiles, and will be described in that connection here.

In the regular commercial production of such laminated windshields, two sheets of bent glass and an interposed layer of tough, non-brittle plastic are first assembled together to provide a glass-plastic sandwich and, after a relatively light preliminary pressure, are finally bonded into an integral composite whole by the action of heat and pressure while immersed in a bath of oil in an autoclave.

Both before assembly, and after laminating, it is important that the curved glass surfaces be thoroughly cleaned and this involves two difficult cleaning operations. In the first one, in addition to normal dust and dirt and small glass chips, if the glass sheets have been bent as a pair, it will also be necessary to remove the parting material from their facing surfaces, and it will be readily appreciated that even one small foreign particle or glass chip remaining on one of these facing surfaces would be laminated into the unit and might result in the rejection of the finished windshield.

Similarly, after lamination, the outer surfaces of the laminated unit will be covered with a film of oil from the autoclave that must be completely removed.

In the early stages of producing laminated windshields, it was a relatively simple matter to remove the oil and other foreign materials from the glass surfaces by conventional washing techniques, because the glass used was either flat or slightly and simply bent. However, with the advent of more and more severely curved designs, including the so-called "hooked," "wrap-around," "panoramic," and "panoramic with a cap" windshields, the difficulties in adequately washing the glass have become a serious commercial problem; and ordinary washing methods, involving rubbing and scrubbing with brushes and the like, have been found to either give insufficient cleaning or to materially slow down production, or both.

It is therefore an object of this invention to provide a novel apparatus capable of thoroughly cleaning sharply and complexly curved surfaces in a continuous manner, and one that is adapted for use on a factory production line.

Broadly stated, the invention contemplates the washing of sheet material in a more thorough and rapid manner than has heretofore been possible, by the use of sonic or ultrasonic vibrations, and in particular the improved washing of curved glass sheets.

The vibration frequencies used are generally over 100 cycles per second and preferably over 10,000 cycles per second and are transmitted in the form of mechanical vibration sound waves, through a suitable medium, for producing energy by means of which work is performed. More particularly, as the sound waves are propagated through the medium, which is preferably a fluid, the motion of the particles of said medium is related to the characteristics of the sound waves. In this manner, the sound waves will create cavitation in a liquid medium; cavitation being the effect of alternate formation and collapse of gas bubbles or cavities. This collapse of the cavities creates an agitation of sufficient magnitude to actually disintegrate particles of substantially solid material; and it has been found that this vibratory agitation may be used to disintegrate particles of foreign matter from surfaces to be cleaned so that such particles may be easily and readily removed therefrom.

In its more specific aspects, the present invention employs the phenomenon just described to wash curved glass sheets by continuously passing such glass articles through a bath of a suitable liquid medium and progressively adjacent a series of generating elements, which propagate vibrations within said medium. These generating elements, which may be, for example, magnetostrictive transducers having a suitable output and frequency, are preferably arranged so as to direct the effect of said vibrations onto the glass sheets at various angles to the surface thereof including impinging vibrations at small acute angles. The desired effect may be achieved by the use of a plurality of transducers positioned to provide vibrations both normal to and almost parallel to surfaces of the sheet. In this manner, the effect of said vibrations is maintained at a maximum over all points of said surfaces.

By moving the curved glass sheets continuously past the generating elements, there will be, in effect, a sweeping washing action across both surfaces. Under this procedure, washing proceeds rapidly, and movement of the sheets concurrent with the washing action multiplies the speed of cleaning. Moreover, when the liquid medium, into which said sheets are submerged during washing contains a detergent, the particles of foreign matter disintegrated upon the surfaces of the glass sheets may be even more quickly removed.

Another object of the invention is to provide a compact washer which occupies a minimum of floor space, and which is constructed for easy loading and unloading.

Further objects and advantages of the invention will become more apparent during the course of the following description when taken in connection with the accompanying drawings.

In the drawings, wherein like numerals are employed to designate like parts throughout the same:

Fig. 1 is a plan view of the preferred form of the apparatus embodying the invention and in which curved glass sheets are moved in a circular path during cleaning;

Fig. 2 is a vertical section of the apparatus disclosed in Fig. 1, taken on the line 2—2 thereof;

Fig. 3 is a detailed section in elevation of the hanger or holding means taken on the line 3—3 of Fig. 2;

Fig. 4 is an enlarged elevation of the yieldable and cushioned clamp;

Fig. 5 is a section of the clamp taken on the line 5—5 of Fig. 4;

Fig. 6 is a plan view of a modified form of the invention in which the curved glass sheets are moved in a vertically disposed, substantially rectangular path during the cleaning operation; and Fig. 7 is a vertical section of the apparatus shown in Fig. 6, taken on the line 7—7 thereof.

Referring to Figs. 1 through 5 inclusive, and particularly to Figs. 1, 2 and 3, there is illustrated the preferred form of the invention, which is designated in its entirety by the numeral 15. This apparatus includes a substantially rectangular, open-topped tank 16, having radially formed projections 17, 18 and 19 (Fig. 2) which are perforated as indicated by the numerals 20, 21 and 22. Flanges 23, 24 and 25 are welded to the outside of the tank circumscribing the perforations and transducers 26, 27 and 28 are secured to the flanges from the outside by bolts 29. Gaskets 30 provide a liquid tight seal between the flanges and the transducers.

The tank is mounted on a framework 31 and legs 32 and is also provided with a loading and unloading platform 33 located above the projection 17. Arrows in Fig. 1 indicate the flow of windshields to and from the washer.

The glass supporting and moving mechanism or conveyor is in the form of a Ferris wheel and, generally indicated by the numeral 34 and is mounted for rotation on a framework 35 rising inside the tank. Bearings 36 are mounted on top of the framework 35 which supports a shaft 37 that forms the axis about which the Ferris wheel rotates. The Ferris wheel is comprised of hubs 38 keyed to the shaft 37, spiders or spokes 39 secured to the hubs, and an annularly shaped angle iron rim 40. The perpendicular leg of the rim is perforated at equally spaced intervals and bearings 41 are bolted to the outside surface of the leg in alignment with the perforations. Shafts 42 supported in the bearings 41 and collars 43 pinned to the shafts limit longitudinal movement thereof and also support a rubber covered hanger or holding means 44 for the windshields 45.

A yieldable glass clamp 46, shown in detail in Figs. 4 and 5, is comprised of a casting 47 having spaced bosses 48 secured to the shaft by pins 49, projections 50 extending outwardly from the bosses and to the right as viewed in Fig. 5 and inwardly into the space between the bosses, and a bridge 51 connecting the bosses at their lower ends and provided with a recess 52 at the midpoint of the bridge; and a second casting 53, mounted for free rotation on shaft 42, provided with a projection 54 containing a recess 55 in the lower face in alignment with the recess 52, and a downwardly extending clamp 56 covered with rubber 57; and a spring 58 seated in recesses 52 and 55 urging the casting 53 in a counterclockwise direction to hold the windshield 45 against the hanger 44.

A right angled gear reduction motor 59 is mounted on a bracket 60 which is fastened to the framework 35 and is connected through coupling 61, sprocket 62, chain 63, to a sprocket 64 which is mounted on shaft 37 to drive the Ferris wheel 34 in a counterclockwise direction. (Fig. 2).

The liquid level in the tank is indicated by a dashed line and the numeral 65. A liquid inlet and outlet pipe may be provided for the tank, if desired, and equipped with automatic thermal and level controls.

Transducers 26 are located directly below the loading platform and are arranged as shown in Figs. 1 and 2. As the windshield 45 enters the wash liquid, the bottom edge, the concave surface, and the top edge are subjected to the vibrating action or cavitation of the wash liquid in the order mentioned.

Transducers 27 are located at the bottom of the tank straddling the vertical center line extending through the axis of shaft 37 and provide a washing action parallel to both surfaces from the lower edge of the windshield.

Transducers 28 are directed through the tank wall that is directly opposite transducers 26 and their washing action is directed at the top edge, convex surface, and lower edge of the windshield in that order.

The arcs travelled by the windshields between transducers 26 and 27 and 27 and 28 provide additional washing area, which is subjected to a lesser degree of cavitation. Drying time is provided between the time the windshields leave the liquid after passing transducers 28 and before arrival at the station 33. Air and heat may be applied to accelerate the drying time.

In the operation of the washing machine of this invention, the tank 16 is filled with a liquid, which is preferably a water solution of a detergent. The detergent solution may vary depending on the type of cleaning which is being done. For example, prior to laminating, dirt and salts used for parting material are removed and after laminating, the oil from the autoclaves must be removed. Accordingly, different detergents may be used depending on the amount of oil or grease which is being removed.

With the detergent solution in the tank, transducers 26, 27 and 28 and conveyor 34 are started, and the glass sheets are positioned on the hangers 44 as each hanger passes the loading station. As has been stated, the transducers 26, 27 and 28 have the vibrating surfaces arranged so that they are each substantially parallel to the path of travel of the glass sheets. The vibrations from transducer 26 generally impinge upon the concave surface of the bent sheets being washed in a right angle, or at a large acute angle, whereas the transducer 27 has its vibrations impinging on the convex and concave surface of the glass sheet at comparatively small acute angles, and the transducer 28 has its vibrations directed against the convex surface in the larger acute angles and perpendicular position. Accordingly, it is seen that as the glass sheet is passed through the washing medium it is subjected to vibrations at substantially all of the angles from 0 to 90 degrees. This provides for the most efficient cleaning action which not only increases the detergent action of the cleaning medium but dislodges small particles of glass and other insoluble material to provide a clean sheet in a single pass through the wahsing machine.

As the holder 44 passes the unloading station which is generally at or adjacent to the loading station, the clean glass sheet is removed and a dirty one is placed in position. In order to facilitate transfer of cleaned and dirty windshields, a resilient clamping means 53 has been provided. It is contemplated that with such a structure, two men may be able to perform both the unloading and loading operations at a single station.

A modified form of the apparatus is shown in Figs. 6 and 7 in which a rectangular open-topped tank 100 is supported on legs 101. The transducers are arranged in banks 102, 103 and 104 projecting through the bottom and side of tank respectively and mounted in the same manner as described above. A loading and unloading platform 105 (Fig. 7) is mounted level with the top of the tank directly above the transducers 102.

A framework 106 is comprised of two rectangular shaped assemblies arranged in parallel, spaced relationship to each and rising from the bottom of the tank to a point above the rim. Each assembly is comprised of a base angle 107, two risers 108 one at each end of angle 107, cross-member 109 connecting the risers 108 at a point above the base angle and a second cross member 110 connecting the tops of the risers 108. Bearings 111 are mounted on cross members 109 and 110 in pairs to provide journals for stub shafts 112 which are provided with collars 113 pinned to the shafts on the outer side of the bearings and sprockets 114 pinned to the shafts 112 inside the bearings with appropriate length spacers 115 interposed between the sprockets and the bearings. Two chains 116 connect the four sprockets 114 associated with each frame assembly.

Bearing blocks 117 are spaced at equal intervals about the chains with the bearings on one chain in horizontal alignment with the bearings on the other chain. Shafts 118 are carried in the bearings 117. Hangers 43—44 and clamps 46 are mounted on shafts 118 in the manner described above and for the same purpose.

A drive for the chains 116 is provided by mounting sprockets 119 to two of the stub shafts 112, connecting sprockets 119 by chain 120 to sprockets 121, which are pinned to a jackshaft 122 which in turn extends across the top of the unit. Bearings 123 and bearing bracket 124 rising from the cross member 110 support the jackshaft 122. A right angled, gear reduction motor 125 is connected to the jackshaft to drive the chains 116 in a counterclockwise direction (Fig. 7).

The wash liquid level is indicated by a dashed line 126, and baffle plate 127 is provided to extend above the liquid level and form separate areas of cleaning fluid so that the cleaning liquid at the point of entry of the dirty glass sheets may be kept out of contact with the cleaning liquid at the exit point of the cleaned glass sheets. With such an arrangement, fresh cleaning fluid is added at the exit point of the clean sheets through inlet 128 and removed at the entrance point of the dirty sheets through outlet 129, so that a flow of cleaning liquid is established which is opposite to the movement of the glass sheets. Such a counterflow provides a cleaner washing medium in the area of the clean windshields and the dirtier cleaning liquid is utilized in the area of the dirty glass sheets thereby achieving greater washing efficiency with a given amount of cleaning material.

In other respects the apparatus operates in the same manner as the preferred form and is fully described in the above specification.

It is to be understood that the forms of the invention shown and described are to be taken as preferred embodiments of the same, and various changes may be resorted to without departing from the spirt of the invention or the scope of the subjoined claims.

We claim:

1. Apparatus for cleaning sheet material, comprising a tank for containing a cleaning liquid therein, a conveyor for carrying sheet material along a definite path into and out of said cleaning liquid, a plurality of holders carried by said conveyor for holding said sheet material, first vibration generating means positioned within said liquid for directing vibratory enegry at relatively large acute angles onto the major surfaces of said sheet material, and second vibration generating means positioned within said cleaning liquid for directing vibratory energy at relatively small acute angles to the major surfaces of said sheet material.

2. An apparatus for cleaning sheet material as defined in claim 1 in which there is a transfer station for removing sheet material from said holders, and a transfer station for adding sheet material to said holders.

3. An apparatus for cleaning sheet material as defined in claim 1 in which yieldable clamping means are provided on said holders for easy transfer of the sheet material.

4. An apparatus for cleaning sheet material, comprising a tank for containing cleaning fluid therein, conveyor means for carrying sheet material into and out of said tank, a plurality of holders on said conveyor means for holding the sheet material to be cleaned in a substantially vertical position, and ultrasonic transducers having vibrating surfaces disposed within said tank including an ultrasonic transducer having a vibrating surface positioned substantially parallel to the path of travel of the sheet being cleaned and opposed to one side thereof, a second ultrasonic transducer having a vibrating surface substantially parallel to the path of travel of the sheet being cleaned and opposed to the other side of the sheet, and a third ultrasonic transducer having a vibrating surface substantially parallel to the path of travel of the sheet being cleaned and opposed to an edge of said sheet.

5. Apparatus for cleaning sheet material, comprising a tank for containing a cleaning liquid therein, a continuous conveyor for moving the sheet material along a definite path downwardly into said liquid and then upwardly out of said liquid, a plurality of holders on said conveyor for holding said sheet material, vibrating means secured to the walls of said tank having vibrating surfaces disposed within said cleaning liquid and so arranged as to sweep the major surfaces of said sheet material with vibration energy directed thereupon, and a baffle plate disposed vertically in said liquid between the entrance and exit points of said conveyor into and out of said liquid and extending transversely of the path of movement of the sheet material to separate the liquid into two portions, said baffle plate having an upper end extending slightly above the surface of said liquid and a lower end immersed in said liquid and disposed slightly above said conveyor therein.

References Cited in the file of this patent

UNITED STATES PATENTS

| | | |
|---|---|---|
| 399,477 | Binnington | Mar. 12, 1889 |
| 936,237 | Curran | Oct. 5, 1909 |
| 1,299,624 | Schuessler | Apr. 8, 1941 |
| 2,248,662 | Edhofer | July 8, 1941 |
| 2,538,242 | Hannon | Jan. 16, 1951 |
| 2,724,666 | Myers | Nov. 22, 1955 |
| 2,752,271 | Walkup | June 26, 1956 |
| 2,802,758 | Kearney | Aug. 13, 1957 |
| 2,811,163 | Weber | Oct. 29, 1957 |